(12) United States Patent
Dowell

(10) Patent No.: US 8,292,523 B2
(45) Date of Patent: Oct. 23, 2012

(54) PROTECTIVE CUP LENS COVER

(75) Inventor: Michael Dowell, Lexington, KY (US)

(73) Assignee: DeluxGear, LLC, Lexington, KY (US)

( * ) Notice: Subject to any disclaimer, the term of this patent is extended or adjusted under 35 U.S.C. 154(b) by 1 day.

(21) Appl. No.: 12/849,968

(22) Filed: Aug. 4, 2010

(65) Prior Publication Data

US 2012/0033299 A1 Feb. 9, 2012

(51) Int. Cl.
*G03B 17/00* (2006.01)
(52) U.S. Cl. ........................ 396/448; 359/511
(58) Field of Classification Search .................. 359/511, 359/600, 808; D16/130, 134, 136; 224/908, 224/909; 396/448, 534
See application file for complete search history.

(56) References Cited

U.S. PATENT DOCUMENTS

| | | | | |
|---|---|---|---|---|
| 3,379,485 A | * | 4/1968 | Steisslinger | 359/611 |
| 4,349,266 A | | 9/1982 | Maeda et al. | |
| 4,383,565 A | * | 5/1983 | Denmat | 206/316.1 |
| 4,415,242 A | | 11/1983 | Major | |
| 4,549,589 A | | 10/1985 | Nguyen | |
| 4,600,278 A | | 7/1986 | Saito | |
| 4,601,318 A | * | 7/1986 | Diegelman | 206/316.2 |
| 4,909,617 A | * | 3/1990 | Boyd | 359/511 |
| 5,077,567 A | * | 12/1991 | Haraguchi et al. | 396/29 |
| D328,753 S | * | 8/1992 | Surber | D16/136 |
| 6,247,855 B1 | | 6/2001 | Motohashi et al. | |
| 6,480,339 B2 | * | 11/2002 | Clark | 359/675 |
| 6,799,854 B1 | | 10/2004 | Steiner | |
| 7,682,091 B2 | | 3/2010 | Zeck | |
| 2007/0297790 A1 | * | 12/2007 | Kogure et al. | 396/504 |
| 2009/0002823 A1 | * | 1/2009 | Law et al. | 359/511 |
| 2010/0027120 A1 | | 2/2010 | Elowitz | |

FOREIGN PATENT DOCUMENTS

| | | | |
|---|---|---|---|
| JP | 04051126 A | * | 2/1992 |
| JP | 11109441 A | * | 4/1999 |
| JP | 2002244179 A | * | 8/2002 |
| JP | 2008132162 A | * | 6/2008 |

OTHER PUBLICATIONS

OP/TECH Product Fact Sheet for the Hood Hat. On line at http://optechusa.com/hood-hat.html. Fact Sheet Attached, retrieved on Jan. 19, 2011.

\* cited by examiner

*Primary Examiner* — Mark Consilvio
(74) *Attorney, Agent, or Firm* — Michael Coblenz

(57) ABSTRACT

A padded protective cup shaped covering sized to slip over a camera lens is disclosed. The covering is designed to fit on either the front portion of the lens or the lens mount. The protective covering has beveled side walls which allow it to fit easily on a variety of different lenses. The protective covering is made from two separate layers of material, an outer cup made from a firm yet flexible material, and the inner liner made from a soft pliable material. The soft inner liner allows the covering to easily adhere to the camera lens, and also provides impact protection. The outer cup provides additional impact protection. The outer cup also includes a domed top portion which provides a crumple zone or impact bumper. In one embodiment the outer cup has a clear optical grade lens or filer lens inserted or incorporated therein, which allows the camera user to take a photograph without removing the protective lens.

15 Claims, 8 Drawing Sheets

PROTECTIVE CUP LENS COVER

CROSS REFERENCE TO RELATED APPLICATIONS

This application claims priority to U.S. provisional application Ser. No. 61/269,602 filed on Jun. 26, 2009, now abandoned, and incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a padded protective covering for protecting both the front and mount portions of a camera lenses.

2. Description of the Related Art

Camera lenses are both fragile and expensive. Professional photographers often have many lenses, and these lenses can represent a significant investment. A camera lens is constructed of a number of elements. The primary component is a tube, called a lens barrel, which contains optical components including glass or crystal optical lenses, mirrors, and prisms inside. The optical lenses within the barrel provide a variety of optical properties that allow photographers to take a variety of different photographs. Camera lenses and their components are well known in the art. The specific components of camera lenses, except for the external structure as it connects with the present invention, form no part of this invention. The term camera lens as used herein means the entire component of the barrel with interior optical lenses.

At one end of the barrel there is a mount for attaching the camera lens to the camera, and at the other end, referred to as the front end, there is an optical lens. The optical lens itself is generally made of a glass or crystal compound. In some cases there are lenses made of clear optical grade plastics such as Lucite, but because of the optical properties required for photography, the vast majority of lenses are made from glass or crystal. This lens component is breakable and can be chipped or nicked if hit with something hard. The barrel is typically made of light steel, aluminum, or plastic, which is brittle and relatively easily damaged. The mount is typically made of thin metal and retained on the camera lens by a series of small screws. The mount is fragile and can be easily damaged.

Many camera lenses have a threaded filter ring at the end, which allows the addition of a filter optical lens that can provide some photographic enhancement features. Such filter lenses are well known in the art. The filter ring is on the inside circumference of the front of the barrel, so the lens filter mounts to the end of the barrel. This filter lens can provide some very minimal protection of the optical lens at the end of the camera lens, but because it is also glass it can be broken.

Many of the components of the camera lenses are fragile and easily damaged. As mentioned, lens barrels are typically made of aluminum or plastic, which can be somewhat brittle and can be easily damaged. Inside large camera lenses, such as telephoto lenses, there are numerous smaller optical lenses and often prisms and mirrors to achieve various optical and focal properties. The components are typically made of plastic, glass, and crystal and are quite fragile. There is a need, therefore, for ways to protect the camera lens, the glass optical lenses and the mounting components at the end of the camera lens.

Many photographers use their equipment in a wide variety of locations. Many sports, wild life, and news photographers use their equipment out of doors and often in very rugged terrain. In many situations the photographer carries the equipment through a wide variety of terrain. Most photographers have a variety of carrying cases for their equipment, and generally these cases are well padded. But in many situations the photographer will have equipment out and ready to use. Often the photographer will have at least one camera slung over his or her neck, ready to be used, and will also often have at least one replacement lens slung over the neck or shoulder. Because of the cost of these camera lenses there is a need for some form of protection.

The most common form of protection for the camera lens is the standard lens cap, which is a hard plastic covering that snaps into the filter ring at the end of the camera lens. An example of this type of cap can be seen in U.S. Pat. No. 4,600,278, to Saito. This provides a small degree of protection to the glass optical lens at the end of the camera lens, but does not protect the lens barrel and internal components from impact damage. This type of plastic lens cap also cannot protect the glass optical lens from an unusually hard impact. A second form of lens protection is a case or covering that covers the entire lens, and in some cases the camera body as well. An example is U.S. Pat. No. 4,549,589 to Nguyen. The '589 patent discloses a case that fits over the body of the camera and has an attachment lens tube case that fits over the lens or lenses, and can be attached to the camera body case. This is useful for transporting the camera and camera lens, but is not convenient for protecting the camera lens while mounted on the camera body, and does not allow for easy placement or removal.

A third form of camera lens protector is the "hood" which is actually a tube mounted to the end of the camera lens. An example is U.S. Pat. No. 7,682,091 to Zeck. The tube extends from the end of the camera lens and so provides some protection for the glass optical lens at the front end. But it provides no impact resistance. Additionally this type of attachment makes the camera lens long and much more likely to impact hard surfaces during transportation. A final example of prior art lens covers is the "Soft Lens Cover" disclosed in U.S. patent application Ser. No. 12/221,277 to Elowitz, filed Aug. 1, 2008, and published in US 2010/0027120. This application discloses a soft, thin covering made of neoprene or other thin flexible material, that stretches over the end portion of the lens. In one variation the soft lens cover can contain a hard plastic insert to provide protection for the camera lens. This application is drawn to a single layer of very thin material that can be stretched over the end of the camera lens, and which will provide only a bare minimum of protection for the camera lens. This device is designed only for the front end of the camera lens and is not suitable for protection of the lens mount. Additionally, the plastic insert creates a hard surface directly against the end of the camera lens, which means that the force of an impact will be transferred directly to the camera lens. There is a need, therefore, for a means for protecting all components of expensive camera lenses.

SUMMARY OF THE INVENTION

The invention provides a protective lens cover made of padded material that is sized to fit easily and securely over the end of a camera lens. Because of the configuration of the lens cover it can be used to cover and protect both the front end of the camera lens, and the mount end of the camera lens.

The lens cover is made of two layers of padded material. The outer layer, referred to herein as the outer cup, is made of a firm yet flexible material such as Sanoprene or vinyl, and the inner layer, referred herein as the inner liner, is made of a softer material such as neoprene. The lens cover is in the shape of a beveled cylinder having a raised domed end. The bevel of the lens cover walls allows the cover to fit easily onto either the lens end or the mount end of the camera lens. The soft inner liner allows the cover to fit snuggly and securely without potentially damaging the delicate components of the camera lens or the finish of the lens barrel. The combination of the soft inner liner and the padded outer cup provides good shock absorption protection should the end of the camera lens impact something hard. Additionally, the domed end of the cover provides additional room or give in the event of impact at the front end of the lens, and provides additional shock absorption and protection to the camera lens.

In an alternate embodiment of the invention there is a clear optical grade polycarbonate disc at the top of the domed portion of the protective cover. This will allow a photographer to take a picture with the lens cover on the camera lens. The lens cover of this embodiment still provides excellent impact protection due to the padded components and the additional bumper space provided by the domed end portion of the lens cover. In a variation of this embodiment the clear disc is removable and replaceable with a standard filter lens.

DETAILED DESCRIPTION OF THE INVENTION

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

Figure 1:
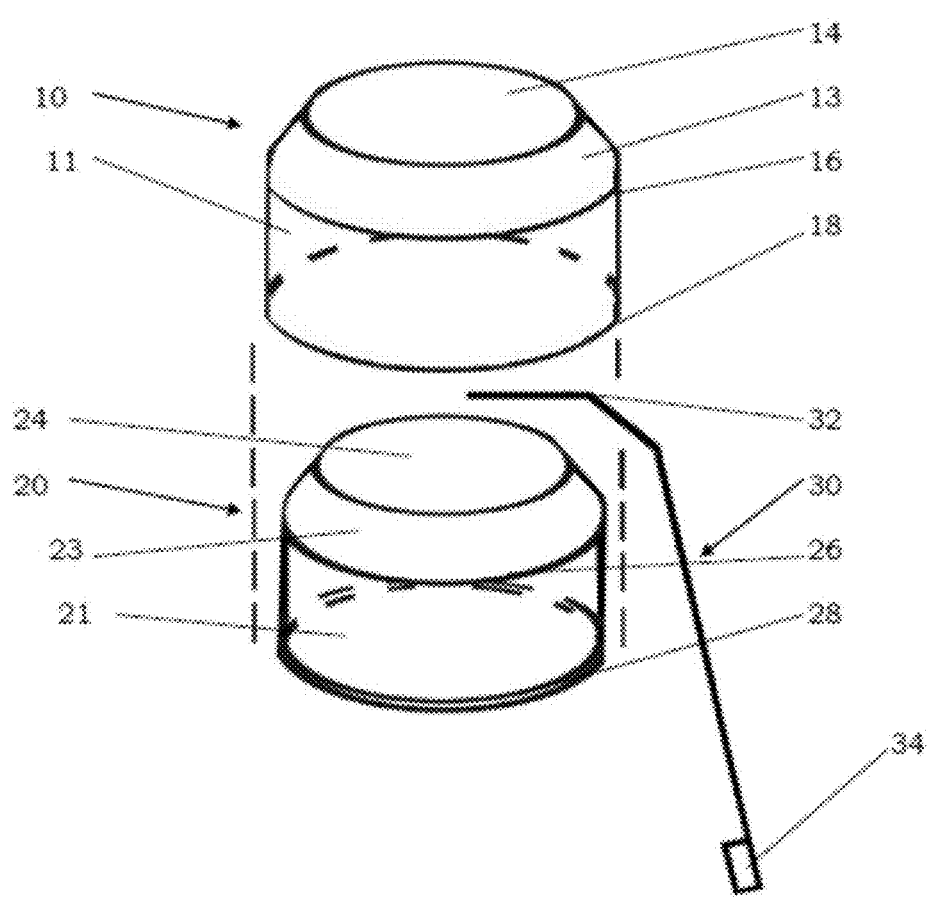
FIG. 1 is an exploded perspective view showing the components of the invention.

The invention can best be seen in FIG. 1, an exploded perspective showing the components of the lens cover 60. The lens cover 60 consists of an outer cup 10 with an inner liner 20 placed inside. The inner liner 20 is shaped the same and sized to fit within the outer cup 10. There is also a tether 30 that attaches to the inner liner 20 to allow the lens cover 60 to be attached to a camera.

Figure 2:
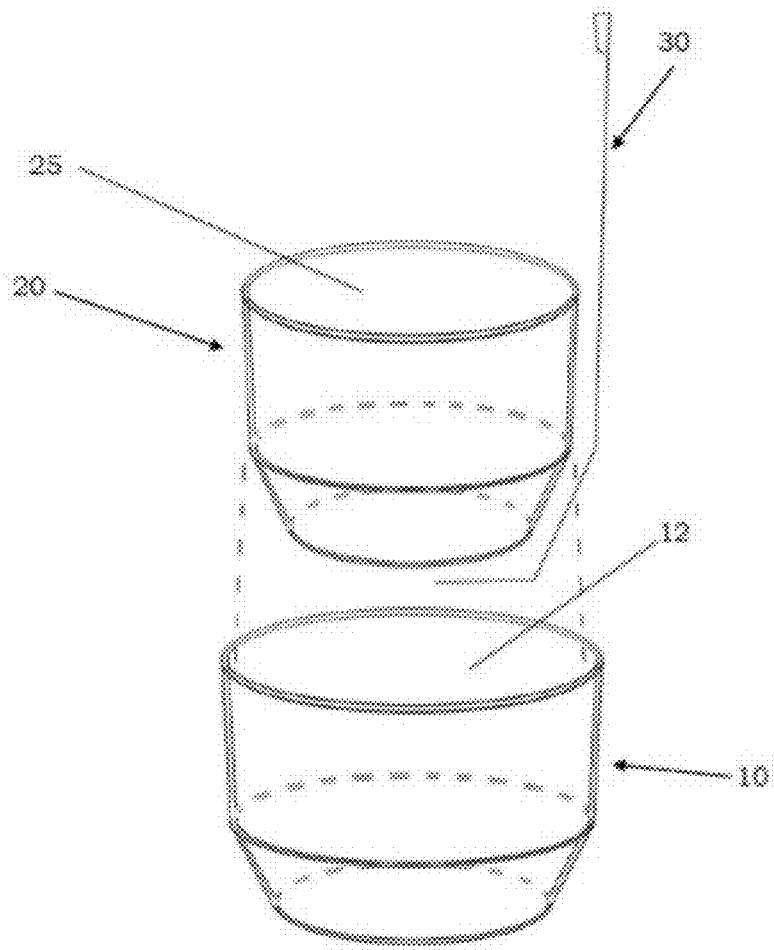
FIG. 2 is an exploded perspective view showing the underside of the components of the invention.

As seen in FIGS. 1 & 2, the outer cup 10 is a thin walled beveled cylindrical shaped cup, with a beveled cup wall 11 that attaches to the dome wall 13, which is then attached to the circular shaped cup top 14. The outer cup 10 is generally made from a single piece of material and each component adjoins the other directly. The beveled cup wall 11 has an opening circumference 18 at the opening end, and a top circumference 16 at the top of the beveled cup wall 11. The opening circumference 18 is slightly larger than the top circumference 16, which gives the cylindrical cup wall 11 the bevel. The dome wall 13 attaches directly to the top circumference 16 and the circular cup top 14 attaches directly to the dome wall 13. The beveled cup wall 11 creates a beveled cylindrical shape cup, a shape commonly referred to as frustoconical. The cup wall 11 is relatively thin, which creates an interior space 12 formed on the inside of the outer cup 10. There is an inner surface formed on the inside of the cup wall.

In the preferred embodiment the diameter of the domed top 14 is a disc 2 inches in diameter. The cup wall 11 is 1.4 inches in height, and the domed wall 13 is 0.6 inches in height. The inside diameter of cup wall 11 where it meets the dome wall 13 is 3.73 inches, and the inside diameter of the cup wall at the bottom is 3.94 inches. The lens cover can be any size to fit corresponding lenses, so the diameters (and circumferences) of the components can vary as needed.

The outer cup 10 is made from a thin flexible yet firm material which can hold its shape and has impact resistance properties. In the preferred embodiment the outer cup 10 is made of a single piece of Sanoprene rubber, which is dip or injection molded into the appropriate beveled cylindrical cup shape. In other embodiments can be made of any other suitable molded soft plastic or vinyl including soft PVC, It is also possible and within the conception of the invention to make the outer cup 10 from leather, since this is a common material for camera equipment covering. In the most preferred embodiment the outer cup 10 is made from 2 mm thick Sanoprene rubber. This type of material is flexible and slightly compressible, but has enough stiffness to hold its form. The outer cup 10 can vary in thickness to produce appropriate strength and compression properties. The most common thickness for the outer cup 10 will be between 1.5 mm to 6 mm thick, although for larger lens covers 60 it is possible to be thicker.

Figure 3:
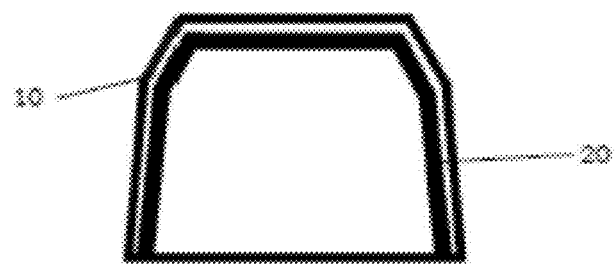
FIG. 3 is a cross sectional view of the invention.

As best seen in FIG. 2, the inner liner 20 is sized and shaped to correspond to, and fit inside, the interior space 12 of the outer cup 10. The inner line 20 in place within the outer cup 10 can be seen in the cross section of FIG. 3. The inner liner 20 has a beveled liner wall 21 which is defined by a liner top 26 and a liner opening 28, wherein the liner opening 28 has a circumference slightly larger than the circumference of the liner top 26 and this creates a beveled cylindrical shape to the inner liner 20. The inner liner 20 also has a liner dome wall 23, and a liner top 24. When the inner liner 20 is in place inside the interior space 12 of the outer cup 10, the liner wall 21 fits snuggly against the inner surface of the cup wall 11, the liner dome wall 23 is snug against the dome wall 13, and the liner to 24 is pressed against the cup top 14 with no space between the inner liner 20 and the outer cup 10. In one embodiment the inner liner 20 is securely attached to the outer cup by conventional means, including gluing. It is also possible to mold the two components together. The inner liner 20 can be attached or adhered within the inner space 12 by any known conventional method. The liner wall 21 is made from a relatively thin piece of soft and pliable material. This creates a liner interior 25 space within the inner liner 20.

In the preferred embodiment, the inner liner 20 is made from Neoprene (polychloroprene), or other similarly soft but flexible and pliable material, including, but not limited to rubber, latex rubber, and other similar synthetic rubber polymer substitutes such as Nitrile (butadiene acrylonitrile), or Butadyl (carboxylated acrylonitrile butadiene rubber with polymer additives). In the preferred embodiment the inner liner 20 is made from 8 mm thick neoprene. It is possible for the material of the inner liner 20 to range in thickness from 2 mm to 8 mm thick. The softness of the material provides impact resistance. It also allows the inner liner 20 to move and form around the components of the camera lens 50 and is soft enough so that it does not harm the components of the camera lens 50.

Figure 4:
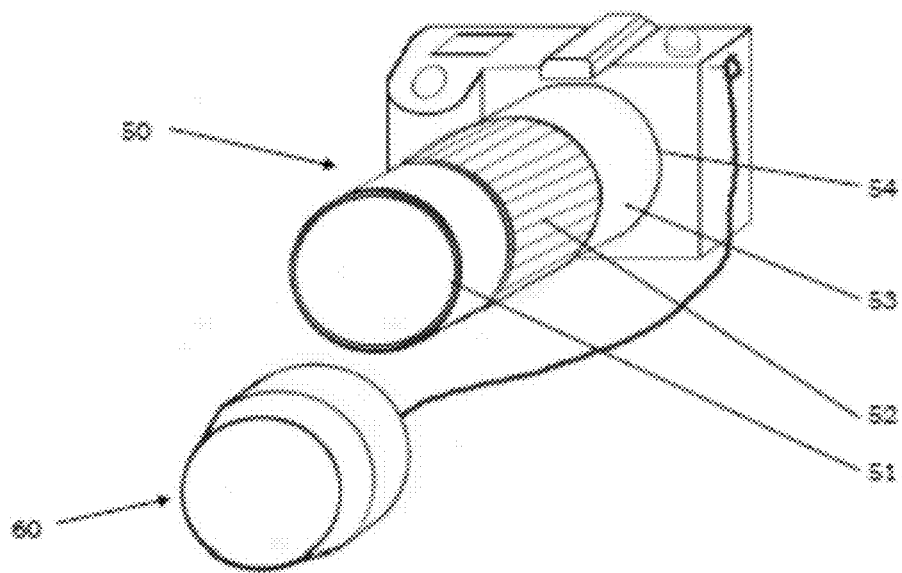
FIG. 4 is a perspective showing a camera with a camera lens and the lens cover of the invention.

The lens cover 60 also includes a tether 30, as seen in FIG. 4, which is used to attach the lens cover 60 to the camera. The tether 30 has a cover end 32, which is attached to the lens cover 60, and a camera end 34 which can be attached to the camera. In the preferred embodiment the cover end 32 is attached to the inner liner 20 between the inner liner 20 and the outer cap 10 by means of sewing or gluing. The camera end 34 will generally have a loop 35 which will allow easy attachment to an attachment point on the camera. Such attachment points on cameras are well known in the art.

Figure 5:
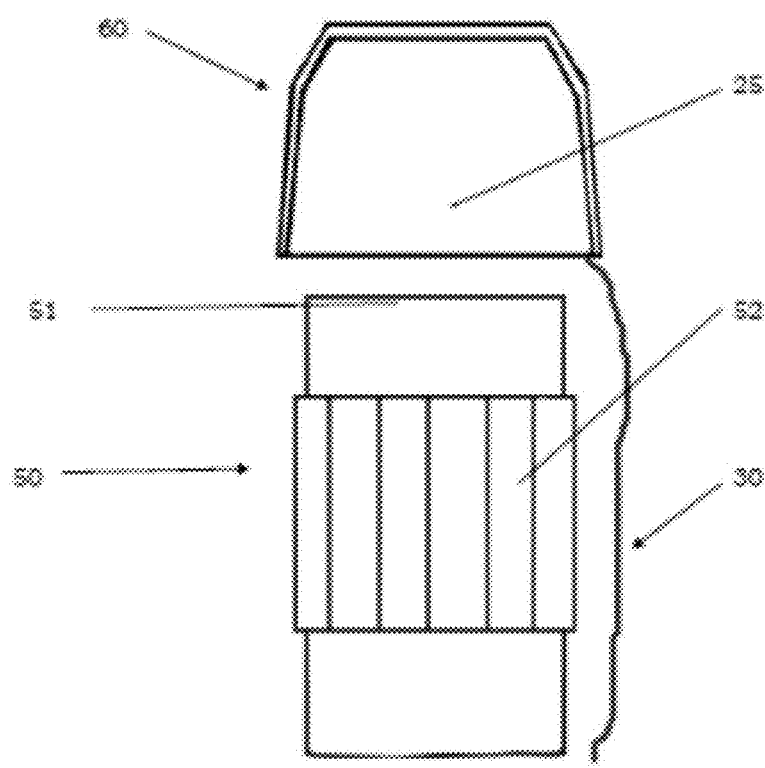
FIG. 5 is a view of a camera lens with the lens cover of the invention.
Figure 6:
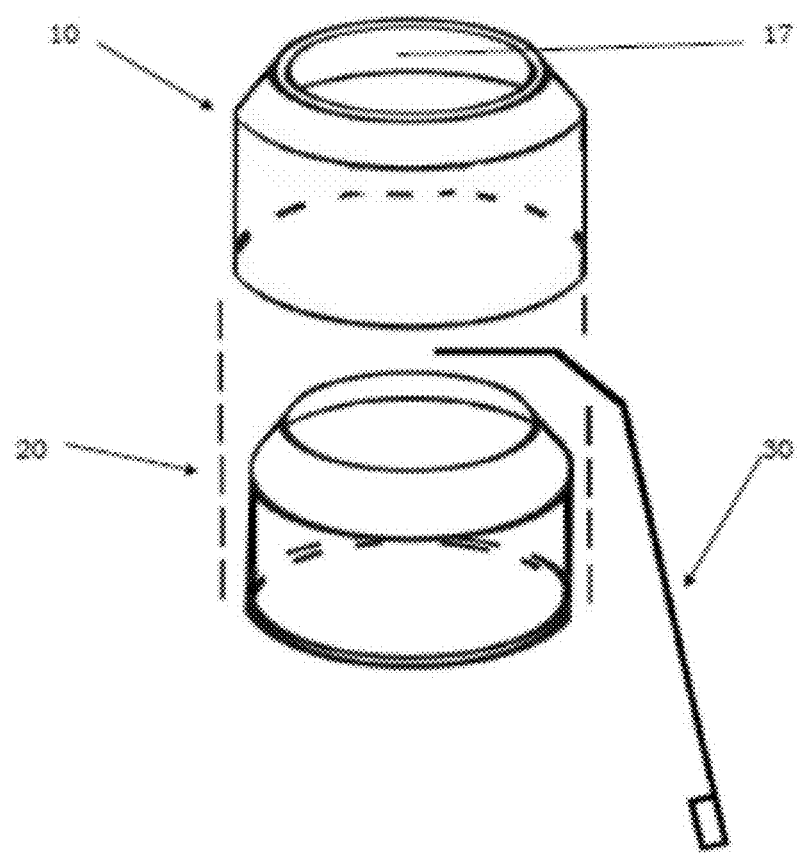
FIG. 6 is an exploded view of an alternative embodiment of the invention having an incorporated clear lens.

As can be seen in FIGS. 4 & 5, the lens 50 has a slightly tapered front end 51. This taper is created by the focus ring 52 being slightly larger in circumference than the lens barrel 53. The beveled feature of the liner wall 21 and the cup wall 11 is designed to roughly correspond to the taper at the front end 51 of the camera lens 50. The mount end 54 of the camera lens 50 also has a slight taper due to the lens mount itself. The liner interior 25 is sized to roughly correspond to the circumference of the lens barrel 53. The neoprene or other soft material of the inner liner 20 allows the lens cover 60 to fit over and snuggly attach to either the front end 51 or the mount end 54 of the camera lens 50, but have enough give so that it does not harm the delicate components of either end of the lens.

The lens cover 60 is designed to provide good impact protection for the camera lens 50. This will also protect the camera itself because the camera lens 50 is attached to the camera by an inflexible camera mount. The lens cover 60 provides impact protection by two means. The first means is the soft material from which the lens cover 60 is constructed. Neoprene is a soft spongy material, which allows it to give when it comes into contact with components of the camera lens 50, thus allowing it to form around either the front end 51 or the mount end 54 of the camera lens 50. The neoprene also provides shock absorption should the lens cover 60 come into contact with a hard material. In addition the outer cup 10 is made from a semi-soft material, such as Sanoprene, which also has give, and also provides additional impact protection. Finally, when the lens cover 60 is in place on the camera lens 50 the domed cup top 14 extends slightly from the end of the camera lens 50. This provides a crumple zone, or room for movement should the extreme end of the lens cover 60 come into contact with a hard surface or material. The additional room provides additional shock absorption in the event that the domed cup top 14 bumps or hits something hard.

Camera lenses come in a wide variety of sizes, from short and squat close up lenses, to long telephoto lenses that at the extreme can be a couple of feet long. The lens cover 60 can be produced in a variety of sizes to fit on the end of any size camera lens. Most lenses have a fairly standard circumference, which are generally describe by the diameter. There are three fairly standard diameter lenses, 58 mm, 77 mm, and 82 mm, but lens diameters can range from 30 mm up to 88 mm. The lens cover 60 of the preferred embodiment is sized to fit these most common lens sizes, but the lens cover 60 can be made in any size to fit any size camera lens. One advantage of the beveled walls and the flexible material is that it can fit some fairly close lens sizes. For example it is possible for the same lens cover 60 to fit both the 77 mm and the 82 mm lens. As shown in FIGS. 10a & 10b, and 11a & 11b, the lens cover 60 will merely sit further up on the bigger lens. Because of the bevel of the walls 11 and 21, the lens cover 60 will be larger than the diameter of the front end 51 of the camera lens 50 but will engage the front of the camera lens 50 as the lens cover 60 moves onto the lens 50. The camera lens mount, which is well known in the art, is also tapered, and the lens cover 60 can be used to cover the lens mount. Many camera lens barrels 53 are relatively cylindrical so the front end 51 of the lens and the mount end 54 of the lens are approximately the same size. That means that a lens cover 60 that fits the front of the camera lens will also be the appropriate size to cover the lens mount as well.

The tether 30 is designed to attach the lens cover 60 to the camera. FIG. 4 shows the lens cover 60 attached to the camera by means of the tether 30. In use a photographer will attach the camera end 34 of the tether 30 to the camera, and slip the lens cover 60 over the front end 51 of the camera lens 50. The beveled walls 11 and 21 will allow the lens cover 60 to fit over the end of the camera lens 50 and then the end of the camera lens will press into the soft inner liner 20. This will provide protection to the camera lens 50 as the photographer moves around. In most cases the camera is worn over the photographer's neck so that the camera lens 50 protrudes out from the photographer's chest. In many cases this means that the camera lens 50 is in a position to impact objects while the photographer is walking or moving. When in place the lens cover 60 provides a great deal of impact protection to the camera and camera lens 50. And when the photographer wants to take a picture, the lens cover 60 can be slipped off the end of the camera lens 50 and it will be held at the end of the tether 30 and in easy reach for replacement.

FIG. 5 shows the lens cover 60 in place to be secured onto the camera lens 50. Most camera lenses 50 have a relatively uniform diameter lens barrel 53. This means that the lens cover 60 can fit on either the mount end 54 or the front end 51 of the camera lens 50. As a result, FIG. 5 does not distinguish which end of the camera lens 50 that the lens cover 60 is attached to.

An alternate version of the invention is shown in FIGS. 6, 7, 8 & 9. In this variation of the invention there is an optical grade clear polycarbonate lens 17 integrated into the domed top 14 of the outer cup 10. In this embodiment the inner liner 20 does not have a liner top 24. The clear lens 17 is sufficiently clear to allow sufficient light to enter the camera lens 50 and allow a photographer to take a picture with the lens cover 60 in place. The domed top 14 portion is particularly important in this configuration since the inner liner 20 does not include the liner top 24 to provide padding at the end of the camera lens 50. If the end of the lens cover 60 comes into contact with a hard object, the domed top 14 will have compression room to provide shock absorption.

Figure 7:
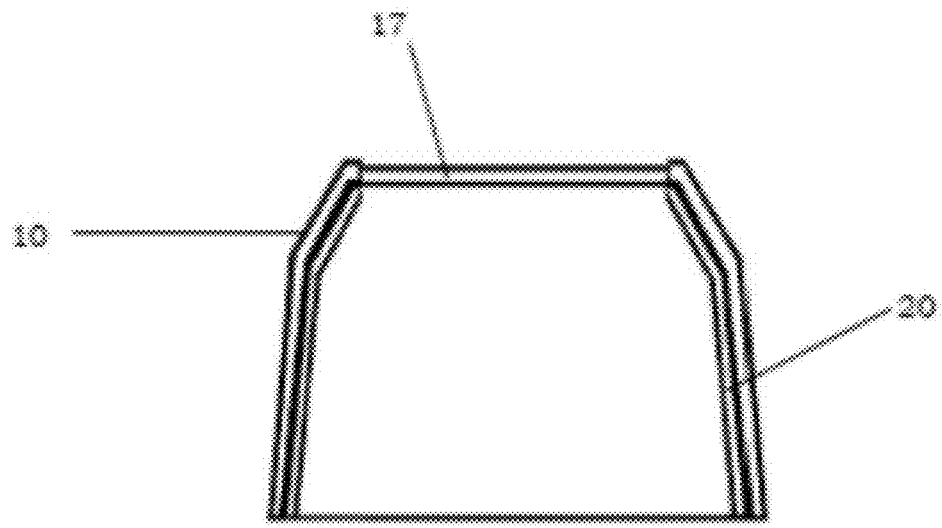
FIG. 7 is a cross section view of one version of the alternate embodiment.
Figure 8:
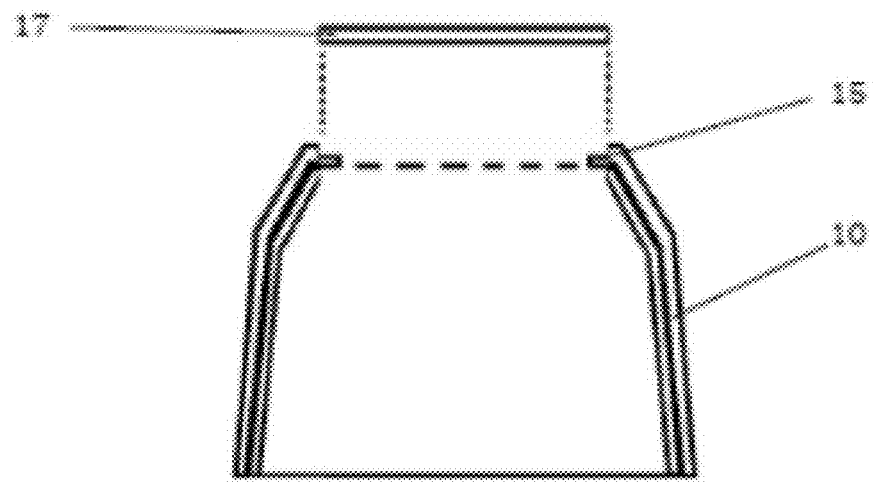
FIG. 8 is a cross sectional view of a second version of the alternate embodiment.

FIG. 7 is a cross section showing the clear lens 17 inserted into a circular opening 19 in the dome top 14. The domed top 14 is circular, and the circular opening 19 is centered within the domed top 14. The cross section of FIG. 7 shows one variation of this alternate embodiment. In this embodiment the clear lens 17 is molded into place inside the domed top 14 of the outer cup 10. It is well known in the art to mold various plastic and polymer components together. The clear lens 17 is a piece of circular optical grade clear polycarbonate placed in the center of the domed top 14, and molded into place. In a second variation, shown in FIG. 8, the domed top 14 has a circular circumferential lip 15 and the clear lens 17 is inserted against the lip 15 and secured in place. The clear lens 17 can also be glued into place within the circumferential lip 15. In this embodiment the photographer can take pictures through the clear lens 17 when the lens guard 60 is in place on the end of the camera lens 50.

Figure 9:
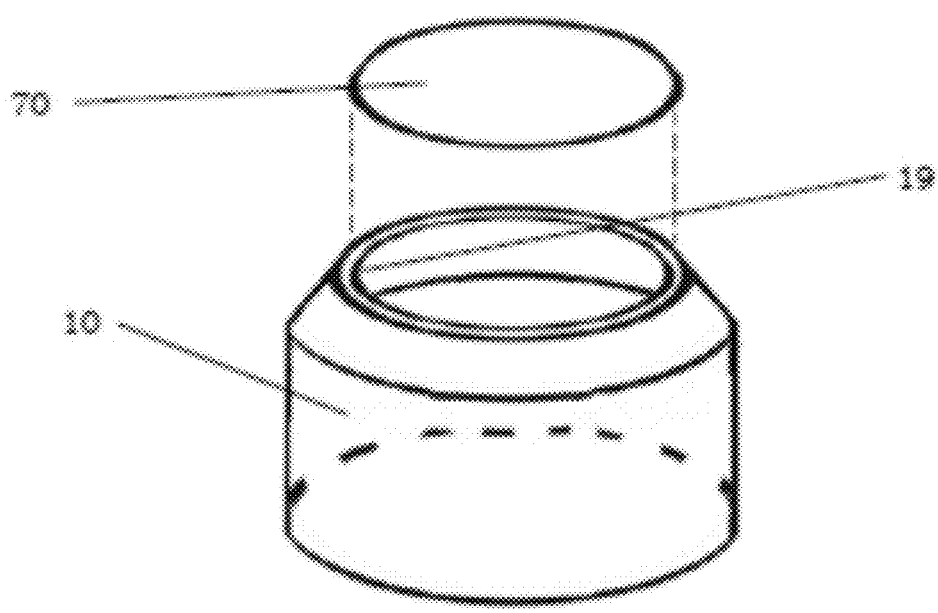
FIG. 9 is an exploded perspective view of a third version of the alternate embodiment.
Figure 10:
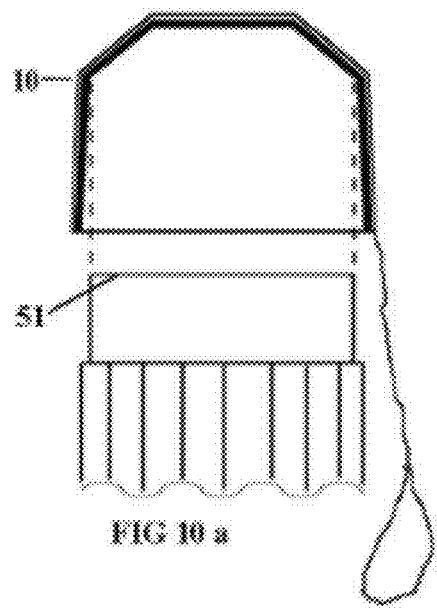
FIG. 10a is a cut away view of a lens guard above a lens.
FIG. 10b is a cut away view of the lens guard in place on the lens.
Figure 11:
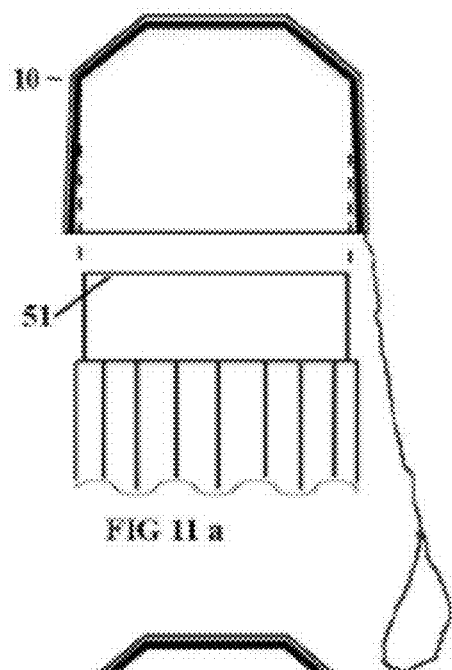
FIG. 11a is a cut away view of a lens guard above a lens.
FIG. 11b is a cut away view of the lens guard in place on the lens.
Figure 10:
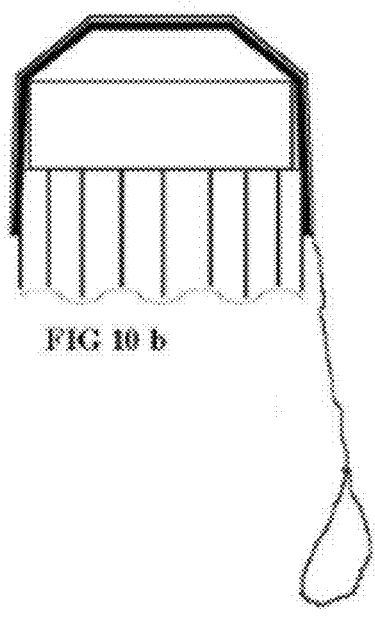
Figure 11:
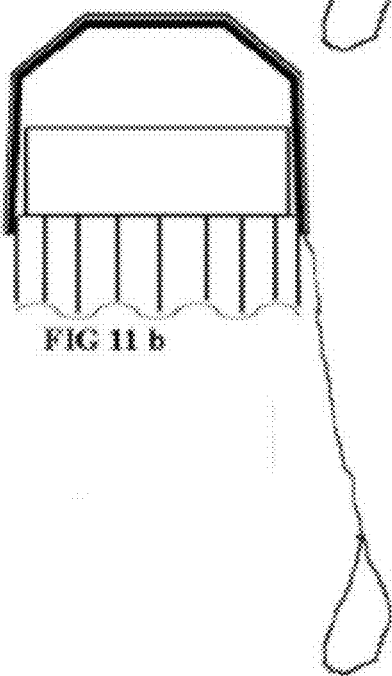

In a variation of this embodiment, shown in FIG. 9, the circular opening 19 is sized to accommodate a standard filter lens 70. Filter lenses 70 are well known in the art and come in standard diameters. In this variation of the invention the circular opening 19 can be the appropriate diameter to allow the standard filter lens to be inserted and held in place. Filter lenses have a threaded portion and screw into the front end 51 of the camera lens 50. It is possible, and within the conception of the invention, to incorporate a threaded lens mount into the circular opening 19 of the lens cover 60 to allow the lens cover 60 to accommodate a wide variety of filters 70.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. A removable protective covering for a camera lens of a camera, comprising:
    a protective outer cup having a cup interior space defined therein;
    a protective inner liner sized to fit inside the cup interior space, said protective inner liner having a liner interior space sized to fit over the camera lens;
    wherein said outer cup and inner liner have beveled walls having a top circumference and an opening circumference, said opening circumference being larger than said top circumference thereby giving said protective covering a frusto-conical shape, and wherein said opening circumference is slightly larger than said camera lens and said top circumference is slightly smaller than said camera lens such that said protective covering can easily fit onto said camera lens, and wherein inner liner can conform to camera lenses of varying sizes to retain said camera lens in place and to provide protection to said camera lens; and
    a domed top having a dome wall and a cup top, said dome wall adjoined with said beveled cup wall and said cup top adjoined with said dome wall to create an enclosed domed top, wherein said enclosed domed top protrudes from said camera lens within said protective covering such that said enclosed domed top creates a hollow compression zone to provide additional impact protection to the camera lens.

2. The removable protective covering of claim 1 further comprising;
    a tether having a camera end and a cover end, said cover end fixedly attached to said protective covering, and said camera end designed for attachment to the camera.

3. The removable protective covering of claim 1 wherein said camera lens has a front end and a mount end and wherein said protective covering is sized to cover and protect either said front end or said mount end.

4. The removable protective covering of claim 1 wherein said outer cup is made from a pliable and flexible material and wherein said inner liner is made from a soft material to provide maximum impact protection.

5. The removable protective covering of claim 1 further comprising a clear optical grade lens incorporated in the domed top, wherein the camera can be used with the protective coving in place on the camera lens.

6. The removable protective covering of claim 5 wherein the outer cup is constructed from molded material and wherein said clear optical grade lens is molded into the cup top of the dome.

7. The removable protective covering of claim 5 wherein the cup top further includes a circumferential lip which holds the clear optical grade lens in place within the cup top.

8. The removable protective covering of claim 1 further comprising a circular opening within said domed top, said circular opening sized to accommodate a standard filter lens.

9. A removable protective covering for a camera lenses of varying sizes, said camera lenses having a mount end and a front end, said protective covering comprising;
    a protective outer cup having a beveled cylindrical side wall and a domed top wherein said side wall and domed top create an interior space therein, said interior space having an interior wall;
    a protective inner liner sized to correspond to and fit directly within said interior space and adhere to said interior wall, said protective inner liner having an inner space sized to fit onto either the mount end or the front end of the camera lens;
    wherein said beveled cylindrical side wall has a opening end and a top end wherein said opening end is sized to fit easily over either the front end or the mount end of said camera lens, and wherein said top end is sized smaller than the end of the camera lens such that said protective covering will abut said camera lens, and wherein further said inner lining is made of soft material that can easily engage and form around said end of the camera lens;
    wherein said domed top extends from said top of said beveled cylindrical side wall to create an enclosed protective zone and wherein when the camera lens is in place within said protective covering no part of the camera lens is within, or engaged with said domed top, such that in the event of impact with an outside object, said domed top enclosed protective zone can compress to provide additional impact protection for said camera lens;
    a tether having a cover end and a camera end, said cover end fixedly attached to said protective covering wherein said camera end can be attached to a camera;
    wherein said protective covering can be placed over either the front end or the mount end of said camera lens to provide protection to the camera lens.

10. The removable protective covering of claim 9 wherein said protective inner liner is made from a soft, pliable, spongy material that easily adheres to the camera lens and which provides impact protection to the camera lens, and wherein said protective outer cup is made from a flexible material.

11. The removable protective covering of claim 9 further comprising;
a clear lens incorporated within said domed top.

12. The removable protective covering of claim 11 wherein said clear lens is form molded into said domed top.

13. The removable protective covering of claim 11 wherein said domed top includes a circumferential lip and wherein said clear lens is held in place within said lip.

14. The removable protective covering of claim 9 wherein said domed top is circular and contains a circular opening therein, said circular opening sized to securely hold a standard filter lens.

15. The removable protective covering of claim 9 wherein said domed top contains a circular opening therein, said circular opening incorporating a filter lens mount ring, wherein a standard filter lens can be secured in said filter lens mount ring.

* * * * *